(12) United States Patent
Ueno et al.

(10) Patent No.: US 9,254,543 B2
(45) Date of Patent: Feb. 9, 2016

(54) MACHINE TOOL (75) Inventors: Junichi Ueno, Saitama (JP); Yutaka Shibui, Saitama (JP)

(73) Assignees: CITIZEN HOLDINGS CO., LTD., Tokyo (JP); CITIZEN MACHINERY CO., LTD., Nagano (JP)

(*) Notice: Subject to any disclaimer, the term of this patent is extended or adjusted under 35 U.S.C. 154(b) by 638 days.

(21) Appl. No.: 13/635,661

(22) PCT Filed: Feb. 23, 2011

(86) PCT No.: PCT/JP2011/053899
§ 371 (c)(1),
(2), (4) Date: Sep. 17, 2012

(87) PCT Pub. No.: WO2011/114843
PCT Pub. Date: Sep. 22, 2011

(65) Prior Publication Data
US 2013/0008002 A1    Jan. 10, 2013

(30) Foreign Application Priority Data
Mar. 17, 2010 (JP) .................. 2010-060150

(51) Int. Cl.
*B23Q 15/24* (2006.01)
*B23Q 15/26* (2006.01)
(Continued)

(52) U.S. Cl.
CPC ............. *B23Q 15/24* (2013.01); *B23Q 15/26* (2013.01); *B23B 3/065* (2013.01); *B23B 7/02* (2013.01); *G05B 2219/35316* (2013.01);
(Continued)

(58) Field of Classification Search
CPC .................. B23Q 15/24; Y10T 29/5126
USPC ............................ 29/37 A; 700/178
See application file for complete search history.

(56) References Cited

U.S. PATENT DOCUMENTS

| 7,313,850 B2* | 1/2008 | Miller .......................... 29/37 A |
| 2007/0186735 A1 | 8/2007 | Shibui et al. |
| 2008/0091295 A1* | 4/2008 | Corey .............. G05B 19/40937 700/178 |

FOREIGN PATENT DOCUMENTS

| CN | 1942272 A | 4/2007 |
| JP | 2002-154034 A | 5/2002 |

(Continued)

OTHER PUBLICATIONS

International Search Report; PCT/JP2011/053899; May 17, 2011.
The extended European search report issued on Sep. 30, 2013, which corresponds to EP11756032.6 and is related to U.S. Appl. No. 13/635,661.

Primary Examiner — Erica E Cadugan
(74) Attorney, Agent, or Firm — Studebaker & Brackett PC (57) ABSTRACT A machine tool is provided with a tool mounting part mounting and holding a tool for working a workpiece, a motor rotating the tool mounting part such that an edge of the tool is inclined with respect to the workpiece, a control device holding the tool standby such that the edge of the tool is positioned at a working standby position proximal to a surface of the workpiece and starting a working movement from the working standby position. In the machine tool, the control device includes a working standby position correcting device to correct the working standby position to a corrected working standby position according to a diameter d of the tool and a rotational angle θ of the tool mounting part such that the tool does not interfere with the workpiece when the tool is held standby at the working standby position in a rotated state by the motor.

4 Claims, 6 Drawing Sheets (51) Int. Cl.
*B23P 23/02* (2006.01)
*B23B 7/02* (2006.01)
*B23B 3/06* (2006.01)

(52) U.S. Cl.
CPC .. *G05B 2219/45136* (2013.01); *Y10T 29/5114* (2015.01); *Y10T 29/5126* (2015.01); *Y10T 82/2502* (2015.01)

(56) References Cited

FOREIGN PATENT DOCUMENTS

| | | |
|---|---|---|
| JP | 2002-341914 A | 11/2002 |
| JP | 2004-174586 A | 6/2004 |
| JP | 2005-81434 A | 3/2005 |

\* cited by examiner

＃ MACHINE TOOL

TECHNICAL FIELD

The present invention relates to a machine tool.

BACKGROUND ART

Conventionally, a machine tool such as a lathe is configured to perform various sorts of working on an object to be worked (workpiece) such as a round bar or the like, which is grasped on a main shaft, by striking a tool such as a tool bit for cutting or a drill edge for creating a hole on the workpiece.

A machine tool, among the above mentioned machine tools, has a configuration in which a tool mounting part is rotatably provided about a so-called B axis (based on JIS) such that a hole or the like which extends along an inclined angle other than 90 degrees with respect to an axis of the workpiece (which is in a direction corresponding to an extending direction of the main shaft) can be drilled by using a rotating tool such as a drill edge (for example, Patent Document 1).

PRIOR ART DOCUMENTS

Patent Documents

Patent Document 1: Japanese Patent Application Publication No. 2002-154034.

SUMMARY OF THE INVENTION

Problem to be Solved by the Invention

In working a workpiece by the above machine tool, in general, a tool is not moved at once from a start position which is away from the workpiece to a working position where the workpiece is to be worked but is moved to a proximal position to a surface of the workpiece (working standby position), temporarily held standby at the working standby position and then struck on the workpiece to start actual working.

Since the closer to the surface of the workpiece the tool is, the shorter a cycle time of working is, it is desired that such a working standby position is as close to the surface of the workpiece as possible.

However, in the machine tool which is configured such that the tool rotates about the B axis, when the tool is held standby at the working standby position in a rotated state, the tool may interfere with the workpiece, even before starting actual working.

Especially in the machine tool in which the working standby position is set to a position very proximal to the surface of the workpiece, there is a problem of a remarkably large possibility of the interference.

Means for Solving the Problem

A machine tool according to the present invention rotatably supports a tool for working an object to be worked such that an edge of the tool is inclined with respect to the object, in performing working of the object by the tool, holds the tool standby such that the edge is positioned at a working standby position proximal to a surface of the object and starts to move the tool from the working standby position to work the object and is provided with working standby position correcting means to correct the working standby position such that the tool does not interfere with the object according to a diameter of the tool and a rotational angle of the tool in holding the tool standby at the working standby position in a rotated state.

Effect of the Invention

According to the present invention, interference of a tool at a working standby position by rotation of the tool can be prevented without large loss of a working cycle time.

MODE FOR CARRYING OUT THE INVENTION

Hereinafter, modes for carrying out the present invention will be explained based on embodiments shown in drawings.

Embodiment

Figure 1:
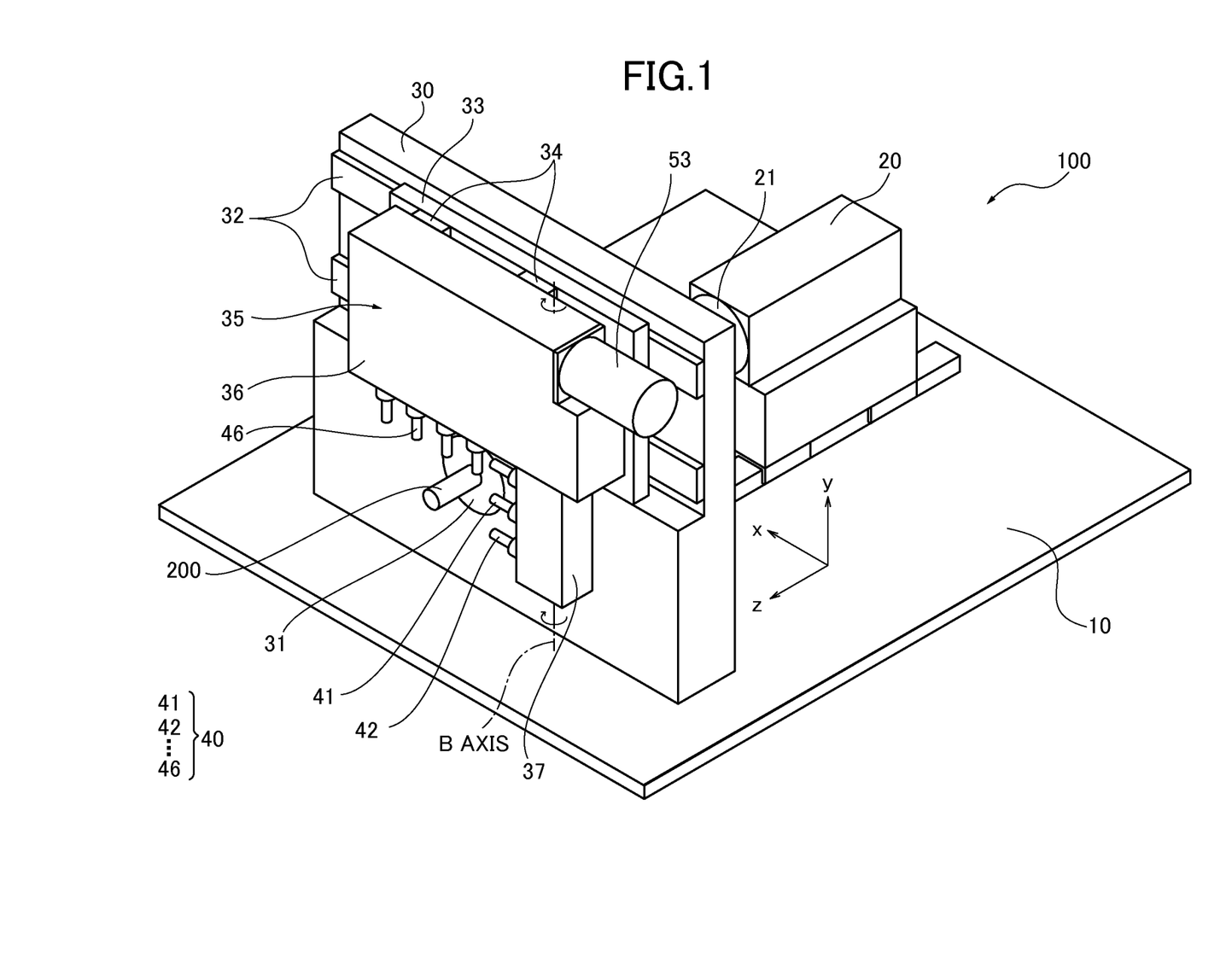
FIG. 1 A perspective view schematically showing an automatic lathe as a machine tool according to the present invention.

FIG. 1 shows an automatic lathe 100 as an embodiment of a machine tool according to the present invention.

The automatic lathe 100 has, on a bed 10, a main shaft base 20 which supports, in a freely rotatably driven manner about an axis line, a main shaft 21 grasping a thin and elongated round bar workpiece 200 as an example of an object to be worked. The main shaft base 20 is provided in a linearly slidably movable manner along a z axis which is in the same direction as the direction of the axis line of the main shaft 21.

On the bed 10, fixedly provided is a guide bush supporting base 30 supporting a guide bush 31.

The guide bush 31 guides the workpiece while allowing a linear movement along the z axis and rotation about the z axis.

On a surface of the guide bush supporting base 30 opposite to a surface directed toward the main shaft base 20, x slide rails 32 extending along an x axis perpendicular to the z axis in a lateral direction are mounted.

On the x slide rails 32, a base member 33 is slidably mounted.

The base member 33 is moved along the x axis on the x slide rails 32 by a motor.

On a surface of the base member 33 opposite to a surface directed toward the main shaft base 20, y slide rails 34 extending along a y axis perpendicular to the z and x axes are mounted.

On the y slide rails 34, slidably mounted is an edged tool base 35 where a plurality of tools 40 (41, 42, 46, . . . ) are mounted and held.

The edged tool base 35 is moved along the y axis on the y slide rails by a motor.

The edged tool base 35 is, as conventionally, capable of arbitrarily moving in the x axis direction and the y axis direction via the x slide rails 32 and the y slide rails 34 with respect to the guide bush supporting base 30.

The edged tool base 35 includes a first tool mounting part 36 (tool mounting part) mounting and holding a plurality of tools 40 in an arrangement along the x axis and a second tool mounting part 37 (tool mounting part) mounting and holding a plurality of tools in an arrangement along the y axis.

Those first tool mounting part 36 and second tool mounting part 37 fixedly hold respective tools 40 arranged respectively according to the types (for example, cutting tool such as a bit) or hold respective tools 40 rotatably about a center of a diameter of each tool 40 (cutting edge such as an end mill, a reamer, a drill edge, and the like).

The second tool mounting part 37 is supported rotatably with respect to the first tool mounting part 36 such that each tool 40 mounted and held on the second tool mounting part 37 is capable of rotating about the B axis parallel to the y axis.

On the edged tool base 35, a motor (turning means) 53 to turn the second tool mounting part 37 is provided. By a drive of the motor 53, the second tool mounting part 37 is turned and each tool 40 mounted and held by the second tool mounting part 37 is rotated about the B axis.

By the movement of the edged tool base 35, an arbitral one from the plurality of tools 40 mounted and held on the first tool mounting part 36 or the second tool mounting part 37 can be selected.

By the movement of the edged tool base 35 and the movement of the main shaft 21, a part of the workpiece 200, which is projected from the guide bush 31 toward a side of the edged tool base 35 can be worked by the selected arbitral one tool 40.

In working, the second tool mounting part 37 is rotated about the B axis and thereby the tool 40 (end mill 41, drill edge 42, or the like) mounted and held on the second tool mounting part 37 is inclined at an angle other than 90 degrees with respect to the axis line of the workpiece 200 and working such as drilling a hole extending at an angle other than 90 degrees with respect to the axis line of the workpiece 200 can be provided.

The edged tool base 35 and the main shaft 30 (each motor) and the second tool mounting part 37 (motor 53) are controlled to be driven by a control device (control means) 70 (see FIG. 8) including an NC device.

The control device 70 uses an NC program as a control program and executes a working of the workpiece 200 based on the control program.

Figure 2:
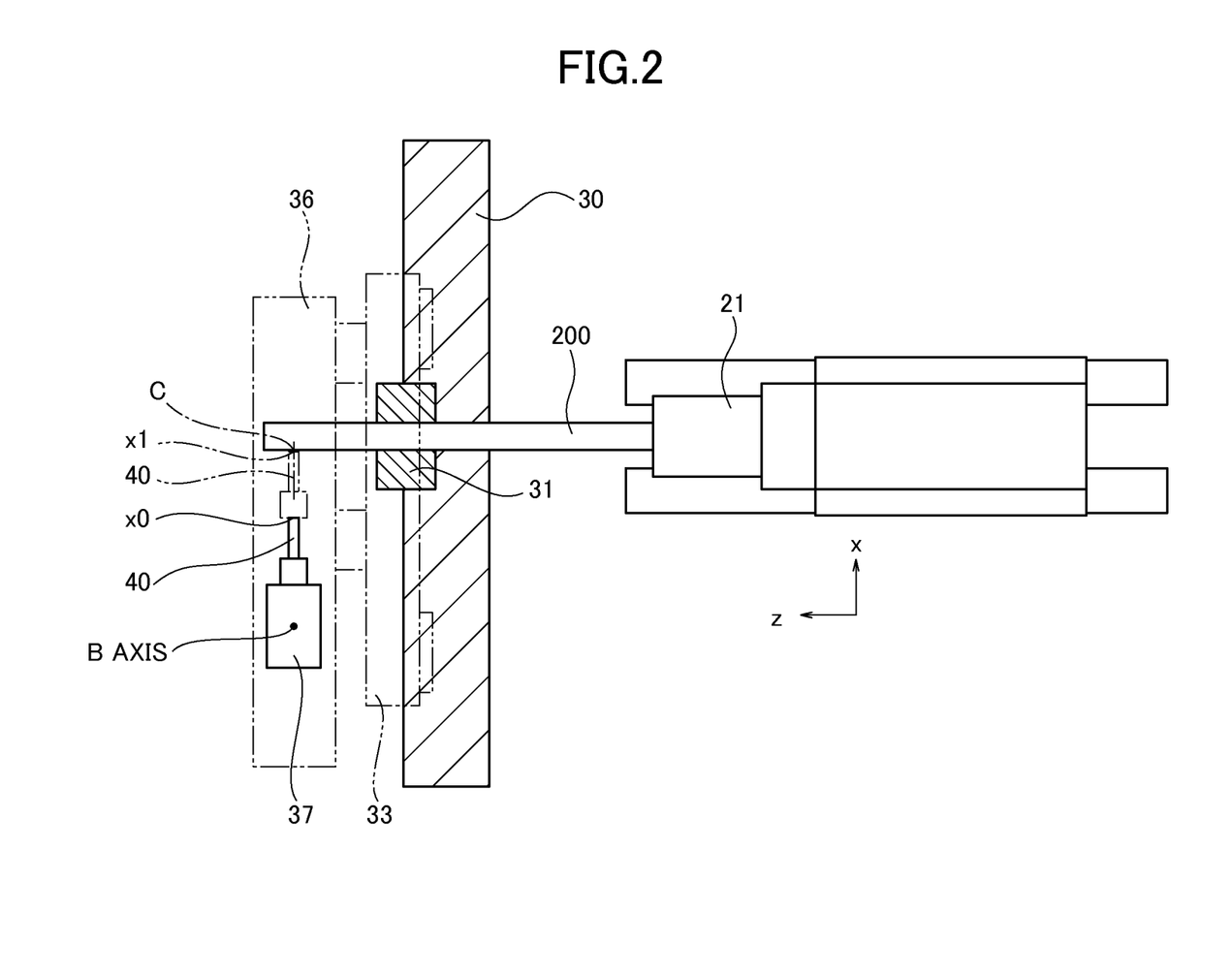
FIG. 2 A schematic view showing a positional relationship between a tool and a workpiece (start position, working position) in a plane passing a main shaft, which is parallel to an xy plane.
Figure 3:
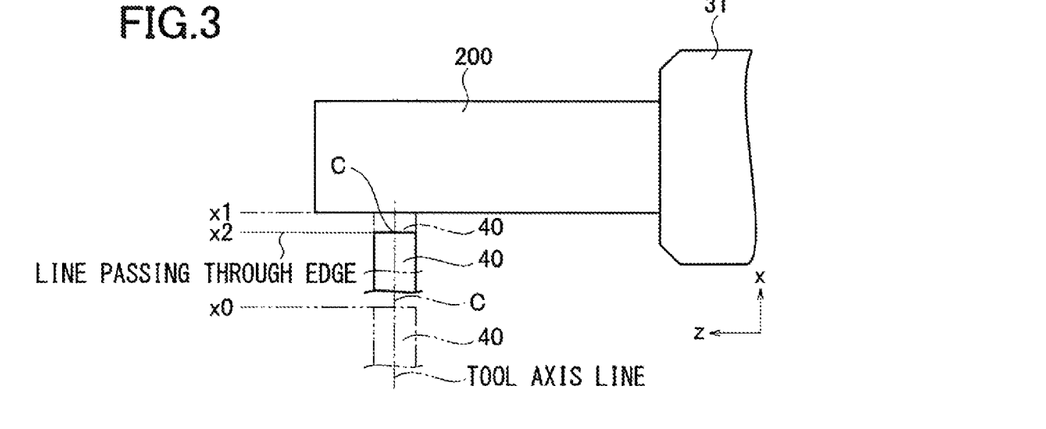
FIG. 3 An explanatory view, which is a plan view corresponding to FIG. 2 and shows a working standby position.

The control device 70 selects a tool 40 (for example, end mill 41) in working the workpiece 200. As shown in FIGS. 2 and 3, the selected tool 40 is moved to be positioned at a working standby position x2 which is proximal to a surface of the workpiece 200 as shown in FIG. 3 and between a start position x0 (shown by a solid line) and a working position x1 (shown by double dotted chain line). The selected tool 40 is temporarily stopped (stood by) and then performs working of the workpiece 200. The start position x0 is a position where an edge (a point C where a line perpendicular to the axis line of the tool 40 and passing through the edge of the tool 40 crosses the axis line of the tool 40) of the selected tool 40 is away from the workpiece 200. The working position x1 is a position where the edge contacts the surface of the workpiece 200 and working is actually started.

Figure 4:
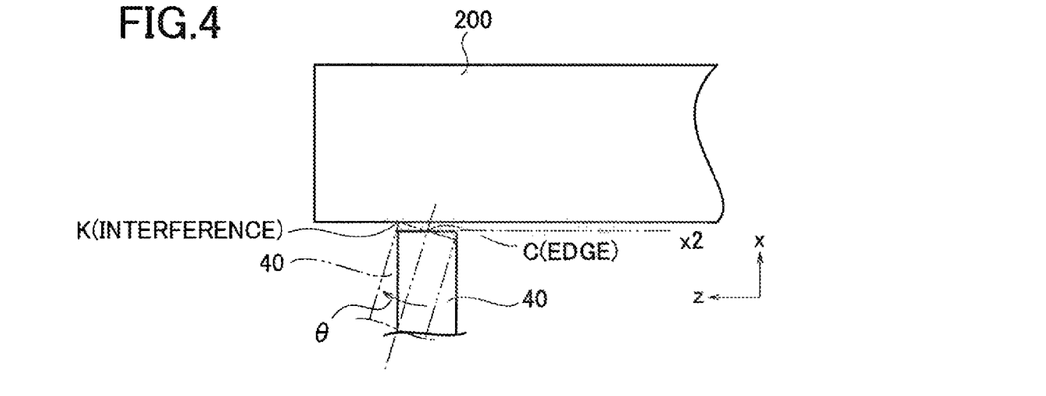
FIG. 4 An explanatory view showing a state where the tool interferes with the workpiece by rotation of the tool at the working standby position.

As shown in FIG. 4, the working standby position x2 is set to a position close enough to have possibility of interference between the tool 40 and the surface of the workpiece 200 in case where the second tool mounting part 37 is rotated about the B axis (see FIG. 2) and the tool 40 mounted on the second tool mounting part 37 is selected.

Furthermore, the tool 40 is just moved between the working standby position x2 and the start position x0 and therefore the edged tool base 35 is moved forward or retracted at a fast-forwarding speed which is a comparatively high speed.

A speed in a working movement passing through the working position x1 from the working standby position is a forwarding speed (cutting speed) of the tool 40 and is preliminarily determined to a speed which is lower than the fast-forwarding speed according to a material of the workpiece 200, a rotational speed of the main shaft 21, a contact angle between the workpiece 200 and the tool 40, a temperature of a cutting oil, and the like.

The control device 70 rotates the second tool mounting part 37 about the B axis in a range between 0 (degree) to 90 (degrees) according to working to be required.

When the second tool mounting part 37 is rotated about the B axis and the tool mounted and held on the second tool mounting part 37 is selected, there is possibility that the tool 40 interferes with the surface of the workpiece 200 at a part K (see FIG. 4) where a linear line perpendicular to the axis line of the tool 40 and passing through the edge contacts an outer circumference of the tool 40.

Therefore, when the working is performed while the second tool mounting part 37 is rotated about the B axis, in order to prevent the interference between the tool 40 and the workpiece 200 at the working standby position x2 in advance, the control device 70 is set to correct the working standby position x2 in an x axis direction to a corrected working standby position x3 which is away from the workpiece 200 (functions as working standby position correcting means 76 (see FIG. 8)).

The control device 70 determines a retracted amount of the working standby position x2 (correction amount) according to a diameter d of the tool 40. Specifically, as the correction amount $\Delta x$ (=x2−x3), d/2, which is a half of the diameter of the tool 40 may be applied.

In the automatic lathe 100, since the second tool mounting part 37 is rotatable about the B axis at an angle $\theta$ (=0 (degree) to 90 (degrees)), when the tool 40 rotates at the angle $\theta$=90 (degrees), the interference between the tool 40 and the surface of the workpiece 200 is prevented if the distance between the edge center of the tool 40 and the workpiece 200 is away from the working standby position x2 by the half of the diameter (d/2) of the tool 40 in the x axis direction.

Figure 5:
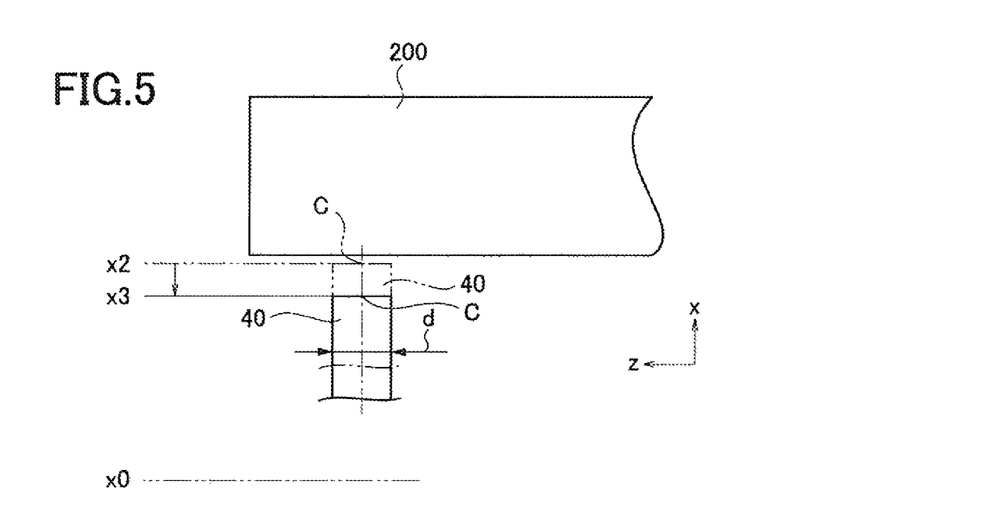
FIG. 5 An explanatory view showing a state where the working standby position is retracted in a direction toward the start position.

Therefore, corrected working standby positions x3 (=x2−$\Delta x$) are set to positions which are retracted by a length d/2 which is ½ of the diameter of the tool 40 with respect to the working standby position x2 in the x axis direction for every rotational angle $\theta$ over 0 degree and below 90 degrees with respect to the preliminarily determined basic working standby position x2. Thereby, the interference between the tool 40 and the workpiece 200 can be prevented at every rotational angle $\theta$ (degree) within 90 (degrees) and therefore it is not necessary to calculate correction amount $\Delta x$ for every rotational angle $\theta$.

The corrected working standby position x3 is not largely retracted from the original basic working standby position x2, and therefore there is no large loss in working cycle time (the working cycle time is not largely extended).

The automatic lathe 100 of the embodiment is, as mentioned above, a so-called NC machine tool controlled by a control program loaded in the control device 70 and therefore a mounting position on the first tool mounting part 36, on which each tool 40 is mounted, a mounting position on the second tool mounting part 37, a type, a diameter d, a length of the tool, and the like are stored in the control device 70.

In performing working of the workpiece 200 (driving control of each motor) according to the control program, when the control device 70 selects a tool 40 and the tool 40 is rotated about the B axis, the control device 70 (a part of the tool diameter obtaining means) reads out and obtains the diameter of the tool 40, and calculates a corrected working standby position x3. Then the control device 70 controls the edged tool base 35 to move the point C of the edge of the tool 40 to the corrected working standby position x3 and holds the tool 40 standby at the corrected working standby position x3 in a rotated state about the B axis.

Then, the point C of the edge of the tool 40 is moved from the corrected working standby position x3 to perform the working by the tool 40.

As described above, according to the automatic lathe 100 of the embodiment, the control device 70 obtains the diameter d of the tool 40 and corrects the working standby position x2 to the corrected working standby position x3 according to the obtained diameter d of the tool 40 so as to not occur interference between the tool 40 and the workpiece 200. Therefore, interference between the tool 40 (part K where the line perpendicular to the axis line of the tool 40 and passing through the edge contacts an outer circumference of the tool 40) and the workpiece can be prevented.

Similarly to the conventional art, the tool 40 is temporarily stopped at a position (corrected working standby position x3) proximal to the workpiece 200. Therefore, working cycle time is not largely wasted and the interference between the tool 40 and the workpiece 200 by rotation of the tool 40 at the position can be prevented.

In case where an edge of the tool 40 such as a drill or the like is projected with respect to an outer circumference of the tool 40, the interference between the tool 40 and the workpiece 200 can be prevented at a part where the line perpendicular to the axis line of the tool 40 and passing through the edge crosses an extending line of the outer circumference. Therefore, the interference between the tool 40 and the workpiece 200 can be prevented.

In the automatic lathe 100 of the embodiment, in case where the tool 40 does not rotate about the B axis, the control device 70 does not perform the above correction of the working standby position x2.

The automatic lathe 100 of the embodiment performs the correction of the working standby position x2 only in case where there is possibility of occurrence of the interference between the tool 40 and the workpiece 200. Thereby, the correction of the working standby position x2 is not performed when there is no possibility of the interference (rotation about the B axis is not performed). Therefore, even a small extension of the working cycle time can be prevented.

The automatic lathe 100 of the embodiment applies ½ of the diameter of the tool 40 as an correction amount Δx set by the control device 70. However, when the maximal limit of the rotational angle θ to be rotated about the B axis is an angle θ (degrees) which is less than 90 (degrees) (<90), as the working standby position x2 is corrected to a position where the tool 40 does not interfere with the workpiece 200 in a state where the tool 30 is rotated to the maximal limit of the angle θmax (degrees) in a rotatable range, the correction amount Δx may be set, according to the diameter d of the tool 40 and the maximal limit θmax (degrees) of the rotatable angle, to (d/2)× sin θmax (Δx=(d/2)×sin θmax).

In the above described embodiment, since the maximal limit of the angle θmax in the rotatable range is 90 (degrees), sin θmax=1 is obtained and the correction amount Δx is ½ of the diameter d of the tool 40 (=d/2). On the other hand, in the automatic lathe 100 where the maximal limit θmax of the angle in the rotatable range is less than 90 (degrees), the correction amount Δx is not increased to d/2, and set to the above value (d/2)×sin θmax. Thereby, since the interference between the tool 40 and the workpiece 200 can be steadily prevented, the correction amount Δx can be controlled to a minimal necessary and therefore the increase of the working cycle time can be controlled to a minimal necessary.

Figure 6A:
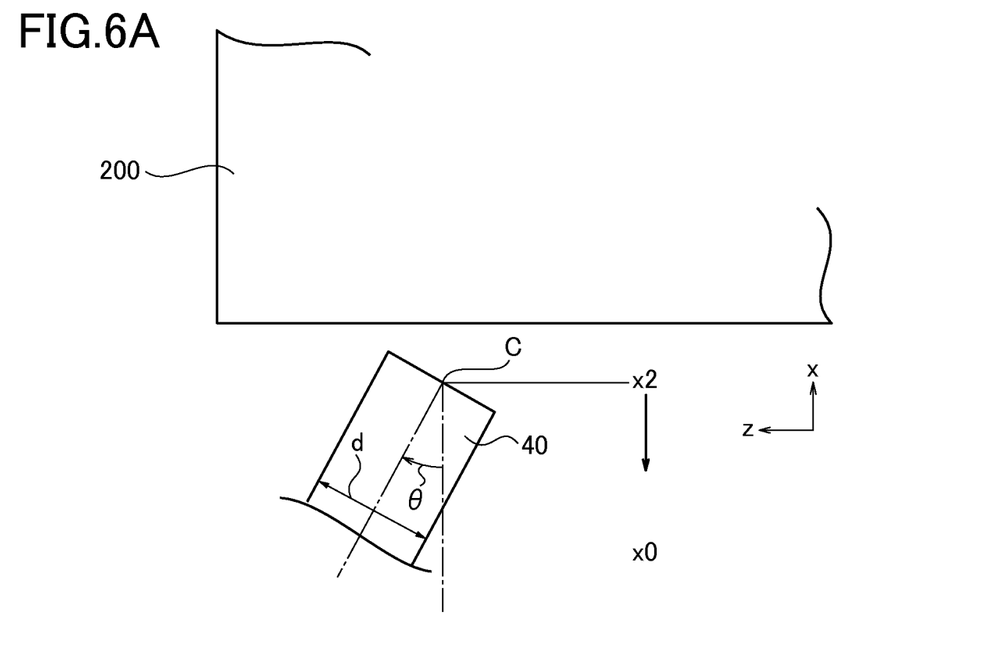
FIG. 6 Views showing rotated states of the tool in the working standby position, (a) at a small rotational angle and (b) at a large rotational angle.
Figure 6B:
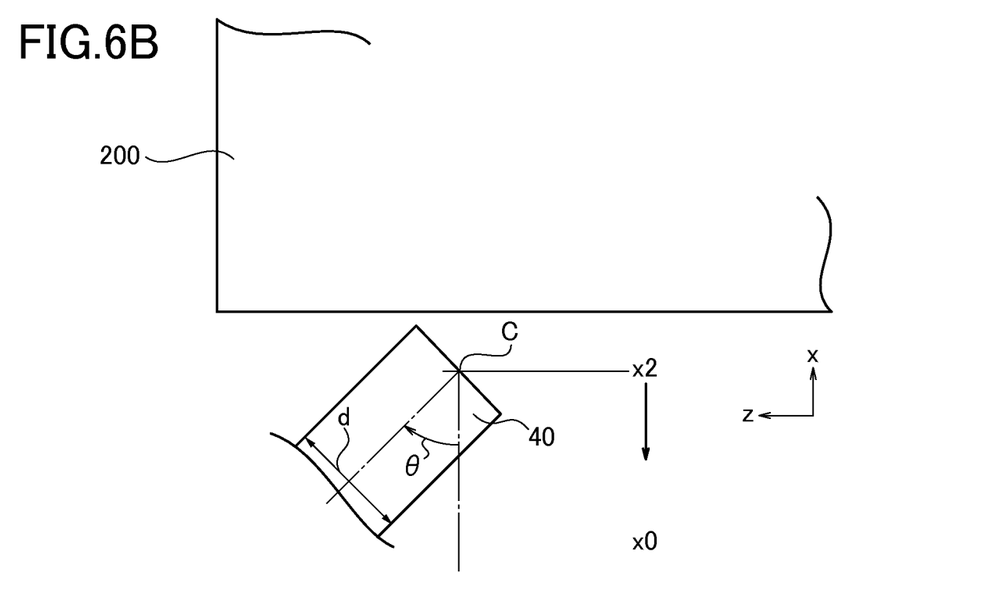

An amount of the tool 40 moving close to the workpiece 200 by rotation of the tool 40 varies according to the diameter d of the tool 40 and the rotational angle θ, as shown in FIGS. 6A and 6B.

By correcting the working standby position x2 only by an amount according to the diameter d of the tool 40 and the rotational angle θ of the tool 40, the correction amount Δx can be finely determined as an appropriate value.

In order that the tool 40 having the diameter d does not interfere with the workpiece 200, a value d×(sin θ)/2 calculated based on the diameter d of the tool and the rotational angle θ of the tool 40 can be applied as the above correction amount Δx.

The control device 70 sets the value d×(sin θ)/2 as the correction amount Δx, and thereby the automatic lathe 100 can correct the working standby position x2 by a minimal necessary according to the rotational angle θ when the tool 40 having the diameter d is rotated at an angle θ about the B axis such that the tool 40 does not interfere with the workpiece 200.

The control device 70 in the automatic lathe 100 of the above described embodiment corrects the working standby position x2 by performing the following steps (1) to (3) when the selected tool 40 is held standby at the working standby position x2 in case where there is a command to rotate the selected tool 40 about the B axis based on a control program.

(1) A tool diameter obtaining step to obtain the diameter d of the tool 40.

(2) A corrected working standby position calculating step to calculate a correction amount Δx based on a formula Δx=d/2 or a formula Δx=(d/2)×sin θ and to calculate a corrected working standby position x3 by a formula x3=x2−Δx based on the calculated correction amount Δx and the working standby position x2.

(3) A working standby position correction step to replace the working standby position x2 by the corrected working standby position x3.

Figure 7:
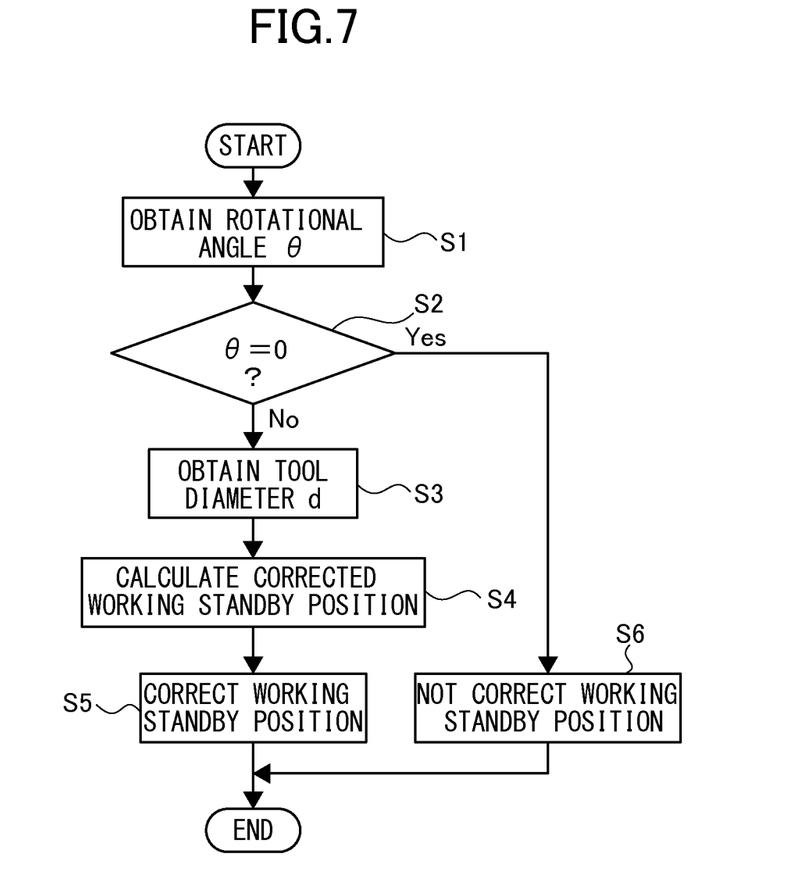
FIG. 7 A flowchart showing steps executed by a control device by a control program.

According to the control program to allow the control device 70 to execute the steps (1) to (3), as shown in FIG. 7, the control device 70 obtains the rotational angle θ about the B axis with respect to the selected tool 40 when the selected tool 40 is held standby at the working standby position x2 (S1), and judges whether or not there is a command of rotation (whether the rotational angle θ=0 (degree) or not) (S2). If there is the command of the rotation about the B axis (other than the case of the rotational angle θ=0 (degree)), the control device 70 obtains the diameter d of the tool 40 by the tool diameter obtaining step (S3), calculates the corrected working standby position x3 by the corrected working standby position calculating step (S4), replaces the working standby position x2 by the corrected working standby position x3 (S5), and moves the tool 40 to the replaced corrected working standby position x3.

On the other hand, in judging whether there is the rotation command (S2), if there is no command of the rotation about the B axis (in case of the rotational angle θ=0 (degree)), the tool 40 is moved to the working standby position x2 without correcting the working standby position x2 (S6).

The above described control device 70 may be considered as a hardware by the control program read in the control device 70.

The control device 70 operates as the following means (11) to (16) (see FIG. 8) by the loaded-in control program.

Figure 8:
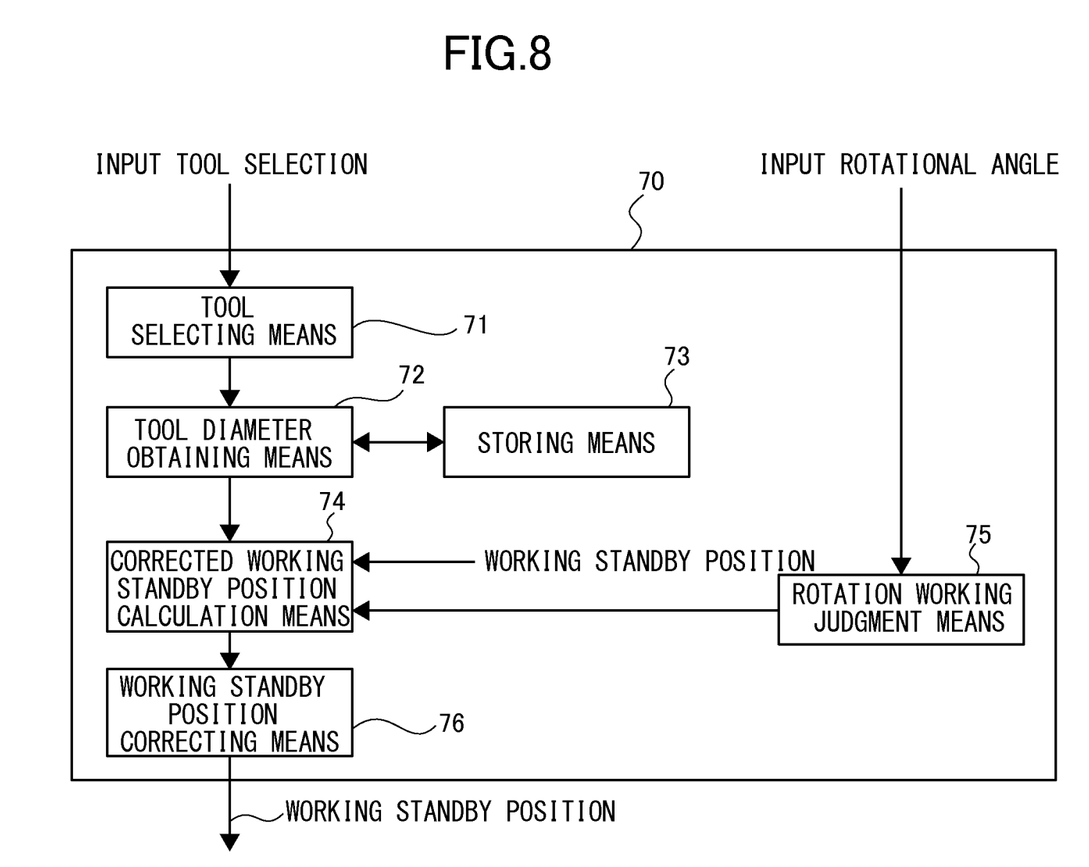
FIG. 8 A block diagram showing a configuration of a hardware which the control device is considered by the control program.

That is, the control device operates as (11) tool selecting means 71 to select one tool 40 to work a workpiece from a plurality of tools 40;

(12) storing means to store a diameter d of the tool 40 for each tool 40;

(13) tool diameter obtaining means 72 to obtain the diameter d of the selected tool 40 from the storing means;

(14) rotation working judgment means 75 to judge whether there is the rotation about the B axis with respect to the tool 40 (whether the rotational angle θ is other than 0 or not) based on the obtained rotational angle θ;

(15) corrected working standby position calculation means 74 to calculate a correction amount Δx based on the diameter d of the tool obtained by the tool diameter obtaining means 72 and the rotational angle θ obtained by the rotational working judgment means 76 and calculates a corrected working standby position x3 based on the calculated correction amount Δx and the working standby position x2; and (16) working standby position correcting means 76 to replace the working standby position x2 by the corrected working standby position x3.

The control device 70 configures a hardware capable of executing steps shown in FIG. 7 by the control program to operate each means (11) to (16).

The invention claimed is:

1. A machine tool which rotatably supports a tool extending along an axis line for working an object to be worked such that an edge of the tool, at an axial end with respect to a direction of the axis line, is inclined at an inclined angle with respect to a surface of the object, which machine tool holds the tool standby such that the edge is positioned at a working standby position between a start position and a working position on a surface of the object, and starts to move the tool from the working standby position to work the object, comprising a working standby position correcting controller device to correct the working standby position such that the tool does not interfere with the object according to a diameter of the tool and a rotational angle of the axis line of the tool and set the corrected working standby position as the working standby position when the tool is held at the working standby position in a rotated state where the edge is inclined at the inclined angle with respect to the surface of the object, wherein the tool is a tool for working the object in contact therewith.

2. The machine tool according to claim 1, further comprising:

a tool mounting part to hold the tool; and a rotating device to rotate the tool mounting part, wherein the tool is configured to be rotated by a rotation of the tool mounting part by the rotating device.

3. The machine tool according to claim 1, wherein the tool is temporarily held standby at the working standby position such that a point where a linear line perpendicular to the axis line of the tool and passing through the edge of the tool crosses the axis line of the tool is positioned at the working standby position before performing working of the object, the tool is rotated and held such that the axis line of the tool is inclined with respect to a direction perpendicular to the surface of the object to be worked, and the working standby position correcting device corrects the working standby position by a length of ½ of the diameter of the tool in a direction that is away from the object and perpendicular to the surface of the object to be worked.

4. The machine tool according to claim 1, wherein the tool is temporarily held standby at the working standby position such that a point where a linear line perpendicular to the axis line of the tool and passing through the edge of the tool crosses the axis line of the tool is positioned at the working standby position before performing working of the object, the tool is rotated and held such that the axis line of the tool is inclined with respect to a direction perpendicular to the surface of the object to be worked, and the working standby position correcting device corrects the working standby position by a distance obtained by ½ of the diameter of the tool multiplied by a sine value of the rotational angle in a direction that is away from the object and perpendicular to the surface of the object to be worked.

* * * * *